(12) United States Patent
Gudlavenkatasiva et al.

(10) Patent No.: US 8,503,648 B2
(45) Date of Patent: Aug. 6, 2013

(54) TELEPHONE NUMBER USE OPTIMIZATION FOR BLOCKS OF TELEPHONE NUMBERS

(75) Inventors: Bhaskar R. Gudlavenkatasiva, Tampa, FL (US); Louis J. Noberini, Jr., Brooklyn, NY (US); Veeravijay Mariappan, Tampa, FL (US); Pradeepan Ravindranathan, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 490 days.

(21) Appl. No.: 12/759,926

(22) Filed: Apr. 14, 2010

(65) Prior Publication Data

US 2011/0255679 A1  Oct. 20, 2011

(51) Int. Cl.
*H04M 3/42* (2006.01)

(52) U.S. Cl.
USPC ............. 379/201.12; 379/201.01; 379/201.02

(58) Field of Classification Search
USPC .............. 379/201.01, 201.02, 221.01, 201.12
See application file for complete search history.

(56) References Cited

U.S. PATENT DOCUMENTS

| 2008/0107102 A1* | 5/2008 | Kaufman et al. ............. 370/352 |
| 2009/0080637 A1 | 3/2009 | Starkes |
| 2011/0038471 A1* | 2/2011 | Gopalakrishna ......... 379/201.01 |

* cited by examiner

*Primary Examiner* — Khai N Nguyen

(57) ABSTRACT

A method may include determining a count of excess telephone numbers (TNs) for removal from a block of TNs associated with a customer. The method may further include determining an order of priority for removing the excess TNs from the block of TNs and marking the excess TNs for removal from the block of TNs in the determined order of priority.

20 Claims, 8 Drawing Sheets

TELEPHONE NUMBER USE OPTIMIZATION FOR BLOCKS OF TELEPHONE NUMBERS

BACKGROUND INFORMATION

A private branch exchange (PBX) is a telephone exchange that may serve a particular business or office, as opposed to an exchange that a common carrier or telephone company may operate for the general public. A PBX, for example, may connect the internal telephones of a private organization and also may connect the internal telephones to a public switched telephone network (PSTN) via trunk lines. A Central exchange (Centrex) is a PBX-like service providing switching at a central office (e.g., at the telephone company) rather than at the private organization's premises. In this case, the telephone company may own and manage the communications equipment (e.g., a switch) and software to implement the Centrex service. The telephone company may sell the services to the private organization (e.g., the customer).

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

PBXs and Centrex groups may be assigned blocks of telephone numbers (TNs). Thus, a university may, for example, be assigned a block of 10,000 TNs for its 9,000 current students to use. The remaining 1,000 TNs, while not currently in use, may be used when, for example, students return from a semester abroad (e.g., so a student may retain the same telephone number) or to accommodate internal use on short notice (e.g., a telethon to raise money).

Telephone numbers, however, are a limited resource and an excessive number of unused TNs by many PBXs or Centrex groups may unduly limit the use of TNs by other customers. The Federal Communications Commission (FCC) regulates the use of TNs to limit the amount of numbers that are set aside for use by a customer but are not being used to provide service on a regular basis. Thus, the FCC allows for blocks of TNs to be assigned to a PBX or Centrex group if fifty percent (50%) or more of the numbers in the block are "working" at all times. The FCC also allows for a TN to be assigned to a PBX or a Centrex group if that TN is "working" for a minimum of 90 days during each calendar year.

Embodiments described herein allow for the determination and/or identification of excess TNs in a block of TNs assigned to, for example, a PBX or a Centrex group. In one embodiment, excess TNs may be identified for removal from a block of TNs in a particular order of priority, which may be configurable. For example, the oldest non-working TNs may be removed first, followed by TNs that match a pattern, and then followed by TNs in sequential order. Other orders of priority for removing excess TNs are possible and the order for priority may be configured based on the PBX or Centrex group. Further, in one embodiment, TNs that should not be removed may also be identified, such as TNs that have become non-working within a time period (e.g., within the past 90 days), which may be configurable. In another embodiment, a sufficient cushion of spare TNs (e.g., assigned but unused or not working) may be determined for a block of numbers, wherein the spare TNs are not considered for removal from the block of numbers.

Figure 1:
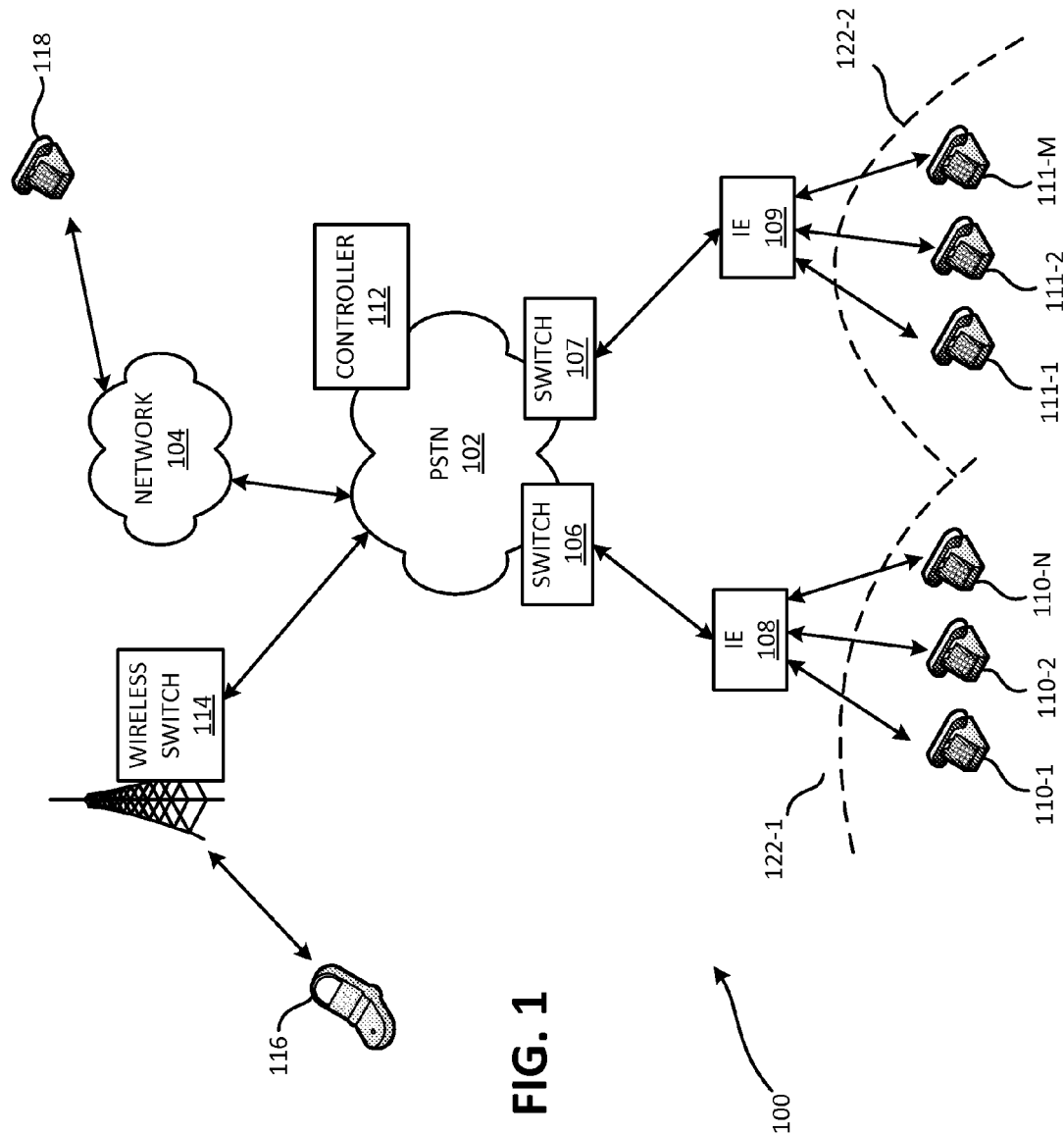
FIG. 1 is a diagram of an exemplary network for implementing embodiments described herein.

FIG. 1 is a diagram of an exemplary network 100 for implementing embodiments described herein. Network 100 may include a public switch telephone network (PSTN) 102, a network 104, switches 106 and 107, intermediary equipment (IE) 108 and 109, telephones 110-1 through 110-N (collectively phones 110, individually phone 110-x), telephones 111-1 through 111-M (collectively phones 111), a controller 112, a wireless switch 114, a mobile device 116, and a telephone 118.

Phones 110 may be associated with a first customer premises 122-1 and a PBX or Centrex group assigned to a first block of TNs. Phones 110 may include any type of residential, business, and/or mobile phone that may be connected to PSTN 102 through intermediary equipment 108 and switch 106. In one embodiment, phones 110 may each be associated with one or more telephone numbers (TNs) in the block of TNs associated with the PBX or Centrex group associated with customer premises 122-1.

Intermediary equipment 108 may include a telephone network box, telephone poles, an entrance bridge, a digital concentrator, fiber-optic cables, digital equipment, etc. Switch 106 may include a class 5 telephone switch, such as a 5ESS switch made by Alcatel-Lucent. Controller 112 may provide administration and management of switch 106. Switch 106 may include switching modules to switch signals (e.g., telephone calls) by interpreting dialed digits and connecting calls between telephones 110, for example. Controller 112 may define blocks of telephone numbers to assign to PBXs and/or Centrex groups, may analyze the use of the assigned TNs, and may remove TNs from blocks of TNs assigned to PBXs and/or Centrex groups.

Wireless switch 114 may control traffic and signaling with a mobile device (e.g., mobile device 116). Wireless switch 114 may include an antenna to transmit and receive signals to and from mobile device 116. Mobile device 116 may include a mobile phone, a radiotelephone, a personal communications system (PCS) terminal, a personal digital assistant (PDA), a laptop, or another portable communication device. Even though mobile device 116 is not in customer premises 122-1, it may still be associated with the same PBX or Centrex group as phones 110, for example.

Network 104 may include one or more packet switched networks, such as an Internet protocol (IP) based network, a local area network (LAN), a wide area network (WAN), a personal area network (PAN), an intranet, the Internet, or another type of network that is capable of transmitting data. Network 104 may also include a circuit-switched network, such as a PSTN (similar to PSTN 102) for providing telephone services for traditional telephones. Phone 118 may be coupled to network 104 and may use a packet-based protocol for transmitting media and establishing calls (e.g., real-time protocol (RTP) and/or session initiation protocol (SIP)). While phone 118 may not be physically located at customer premises 122-1, phone 118 may be associated with the same PBX or Centrex group as phones 110, for example.

Phones 111 may be associated with a second customer premises 122-2 and a PBX or Centrex group assigned to a second block of TNs different than the block of TNs associated with first customer premises 122-1. Phones 111 may be connected to PSTN 102 through intermediary equipment 109 and switch 107. In one embodiment, phones 111 may each be associated with one or more telephone numbers (TNs) in the block of TNs associated with the PBX or Centrex group associated with second customer premises 122-2. Phones 111, intermediary equipment 109, and switch 107 may be configured and operate similarly to phones 110, intermediary equipment 108, and switch 106 discussed above.

The exemplary configuration of devices in network 100 is illustrated for simplicity. Network 100 may include more devices, fewer devices, or a different configuration of devices than illustrated in FIG. 1. For example, network 100 may include thousands or millions of customer premises, each associated with a PBX or Centrex group and telephones. In some embodiments, the functions performed by two or more devices may be performed by any one device. Likewise, in some embodiments, the functions performed by any one device may be performed by multiple devices. Further, the connections shown in FIG. 1 are exemplary. In other embodiments, additional connections that are not shown in FIG. 1 may exist between devices (e.g., each device may be connected to every other device). The connections in FIG. 1 may also be wireless or wired.

Figure 2:
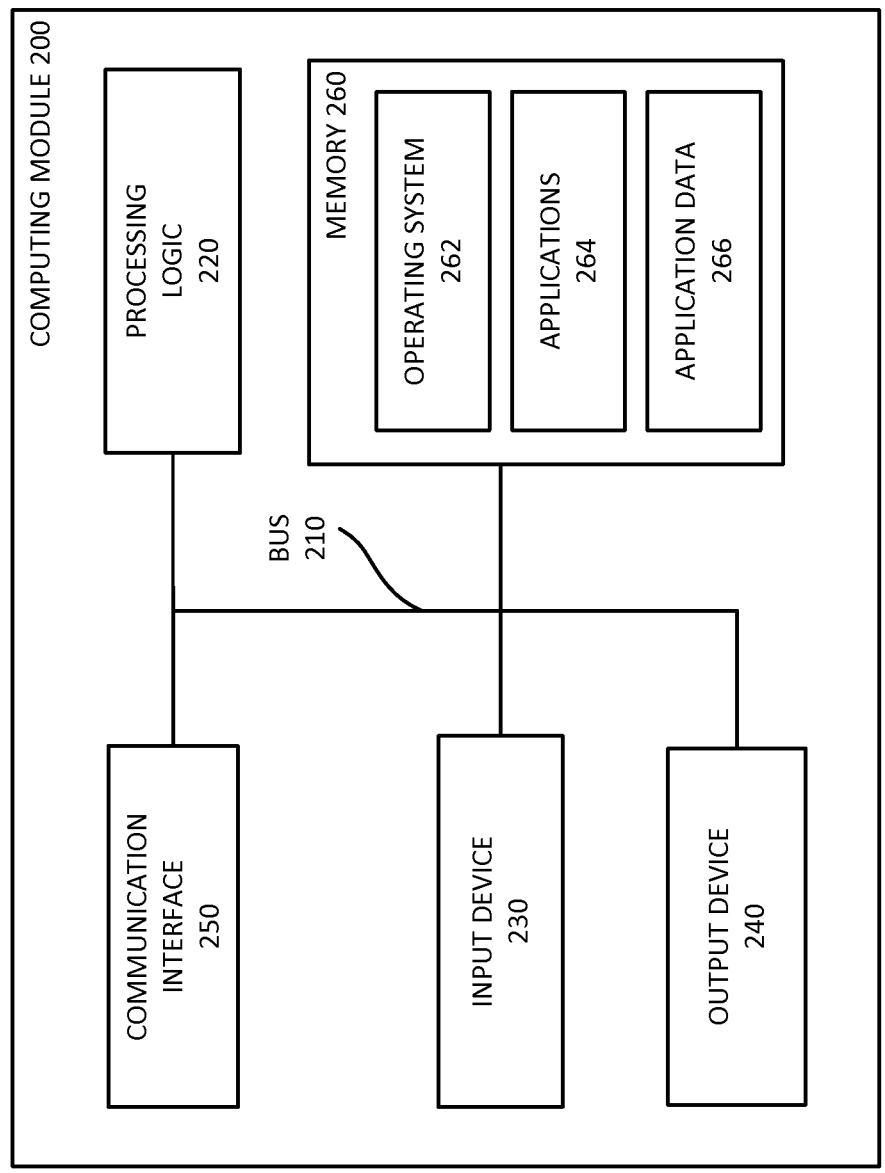
FIG. 2 is a block diagram of exemplary components of a computing module.

Devices in network 100 may include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), or the like.

Input device 230 may allow a user to input information into computing module 200. Input device 230 may include a keyboard, a mouse, a pen, a microphone, a remote control, a touch-screen display, etc. Some devices, such as switch 106, may be managed remotely and may not include input device 230. In other words, some devices may be "headless" and may not include a keyboard, for example.

Output device 240 may output information to the user. Output device 240 may include a display, a printer, a speaker, etc. For example, controller 112 may include a display (an output device), which may include a liquid-crystal display (LCD) for displaying menus and content to the user. Headless devices, such as switch 106, may be managed remotely and may not include an output device 240 (e.g., a display), for example.

Input device 230 and output device 240 may allow the user to activate and interact with a particular service or application, such as an application to optimize telephone number use for blocks of TNs in, for example, a PBX or Centrex groups. Input device 230 and output device 240 may allow the user to receive and view a menu of options and select from the menu options. The menu may allow the user to select various functions or services associated with applications executed by computing module 200.

Communication interface 250 may include a transceiver that enables computing module 200 to communicate with other devices and/or systems. Switch 106, for example, may include a number of switching modules to perform switching operations by interpreting dialed digits and connecting calls between telephones 110. Communication interface 250 may include a transmitter that may convert baseband signals to radio frequency (RF) signals and/or a receiver that may convert RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications.

Memory 260 may store, among other things, information and instructions (e.g., applications 264 and operating system (OS) 262) and data (e.g., application data 266) for use by processing logic 220. Memory 260 may include a random access memory (RAM) or another type of dynamic storage device; a read-only memory (ROM) device or another type of static storage device; and/or some other type of magnetic or optical recording medium and its corresponding drive (e.g., a hard disk drive (HDD)).

OS 262 may include software instructions for managing hardware and software resources of computing module 200. For example, OS 262 may include Unix, Linux, Windows, OS X, an embedded operating system, etc. Applications 264 and application data 266 may provide network services or include applications, depending on the device in which the particular computing module 200 is found.

Computing module 200 may perform the operations described herein in response to processing logic 220 executing software instructions contained in a computer-readable medium, such as memory 260. A computer-readable medium may include a physical or logical memory device. The software instructions may be read into memory 260 from another computer-readable medium or from another device via communication interface 250. The software instructions contained in memory 260 may cause processing logic 220 to perform processes that are described herein.

Figure 3:
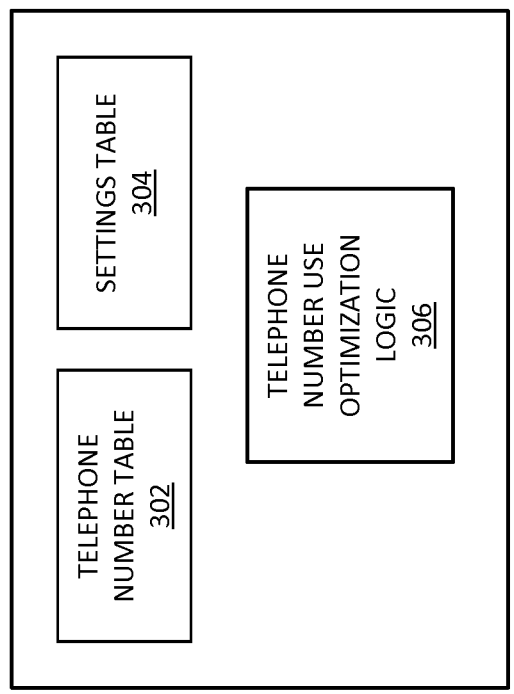
FIG. 3 is a block diagram of exemplary components of the controller of FIG. 1.

As discussed above, controller 112 may control and program switch 106 for handling blocks of TNs for PBX or Centrex groups. FIG. 3 is a block diagram of exemplary components of controller 112 (e.g., functions performed by application 264 in processing logic 220 or stored in memory 260 of controller 112). Controller 112 may include a telephone number (TN) table 302, a settings table 304, and telephone number use optimization logic 306. Some components shown in FIG. 3 may also be stored in other devices in network 100. For example, TN table 302 may also or alternatively be stored in switch 106.

Optimization logic 306 may analyze TNs in a block of TNs associated with groups, may recommend the removal of TNs from the block, and may remove the TNs from the block. In one embodiment, optimization logic 306 may perform processes 600A and 600B described below.

Figure 4:
FIG. 4 is a block diagram of an exemplary telephone number table.

TN table 302 may store information related to telephone numbers, such as the group associated with a telephone number and the status of the telephone number. FIG. 4 is a diagram of exemplary TN table 302. A record (e.g., an entry) 452-x in TN table 302 may associate a telephone number with a PBX or Centrex group and may provide the status for the corresponding telephone number. TN table 302 may include a group field 402, a telephone number (TN) field 404, a working flag field 406, a periods working field 410, a marked-for-removal field 412, and an approved-for-removal field 414. TN table 302 may include additional, different, or fewer fields than illustrated in FIG. 4.

Group field 402 may include a value to identify (e.g., uniquely identify) a group (e.g., a PBX, Centrex group, or any block of TNs). For example, each customer may be associated with a different PBX or Centrex group identified in group field 402. TN table 302 specifies two groups in group field 402: group 422-1 and group 422-2. Group 422-1 may be associated with customer premises 122-1 and group 422-2 may be associated with customer premises 122-2, for example.

TN field 404 may include a value specifying a telephone number associated with the corresponding group identified in group field 402. An exemplary value in TN field 404 includes "2018917239".

Working flag field 406 may include an indication of whether the corresponding telephone number is working (e.g., in use). A "working" TN may include a TN that when called, for example, rings a telephone, such as telephone 110-x. A "working" TN may also include a TN that is associated with a calling plan for receiving or originating calls. A value of "Y" or "1" in working flag field 406 indicates, for example, that the corresponding TN is working. Whereas, a value of "N" or "0" indicates that the corresponding TN is not working. A TN that is non-working (e.g., is not in use) may be considered an "available" TN in that the TN is available to be reassigned to another customer (e.g., another PBX or Centrex group or block of TNs).

Periods working field 410 may include values to indicate the time periods during which the corresponding TN has been working For example, as specified in record 452-1, the TN of 2018917239 was working from Sep. 9, 2008, to May 13, 2009; was not working from May 14, 2009, to Sep. 8, 2009; and was working again from Sep. 9, 2009, to present (where "present" indicates the current date). In one embodiment, periods working field 410 only includes values associated with the past 12 months, for example. In one embodiment, periods not specified as working may be considered non-working periods.

A TN may be identified for removal from a block of TNs associated with a group before actual removal of the TN. Marked-for-removal field 412 may include an indication of whether optimization logic 306 has identified the corresponding TN for removal from the block of TNs associated with the corresponding group. Approved-for-removal field 414 indicates that the telephone company or customer, for example, has approved the removal of the corresponding TN from the block of TNs associated with the group.

Figure 5:
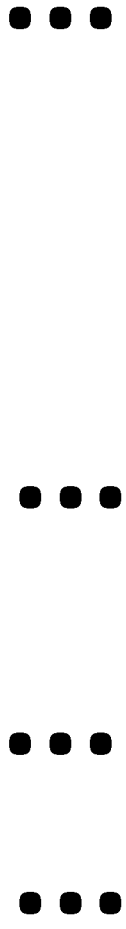
FIG. 5 is a block diagram of an exemplary group settings table.

Returning to FIG. 3, settings table 304 may store settings for optimizing the use of telephone numbers for different groups. FIG. 5 is a diagram of exemplary settings table 304. A record (e.g., an entry) 552-x in settings table 304 may define parameters associated with the corresponding group, such as parameters for optimizing the use of telephone numbers for the corresponding group. Settings table 304 may include a group field 502, a cushion factor field 504, a working window field 506, and an excess TN removal rule field 508. Settings table 304 may include additional, different, or fewer fields than illustrated in FIG. 5.

Group field 502, may include a value to identify (e.g., uniquely identify) a group (e.g., a PBX or Centrex group or any block of TNs). For example, each PBX or Centrex customer may be associated with a different group identified in field 502. Settings table 304 specifies the same two groups in group field 502 as in TN table 302: group 422-1 and group 422-2. As with TN table 302, group 422-1 may be associated with customer premises 122-1 and group 422-2 may be associated with customer premises 122-2, for example.

Cushion factor field 504 may include a value to create a margin of spare TNs (e.g., assigned but not working or unused TNs) for a group. For example, a university may be associated with non-working TNs so that when a student returns from studying abroad, that student may be assigned the same TN as before the student left (e.g., that TN will not be disassociated from the group). In the example of FIG. 5, if group 422-1 is associated with 200 working TNs, and cushion factor field 504 specifies a value of 80%, then optimization logic 306 create a cushion of 160 additional non-working TNs for the group. In other embodiments, cushion factor field 504 may specify a fixed margin (e.g., 50 TNs) rather than a scaling margin (e.g., 80%). Cushion factor field 504 may also specify other ways (functions) of determining a cushion factor. Cushion factor field 504 may specify different cushion factors for different groups.

In many instances, TNs that recently became non-working may be likely to become working within a period of time. Working window field 506 may include a value specifying a threshold time period (e.g., the number of days) after a TN becomes non-working that the TN should not be counted or considered for removal from the group. For example, an employee may quit his job and the corresponding TN may become non-working. The employer may replace the departed employee with a new employee with the same job, however, and may wish to assign the same TN to the new employee. Working window field 506 may specify the threshold time period that a reuse of a TN typically takes place. In one embodiment, the recently non-working number may not be considered for removal by TN use optimization logic 306. Different groups may include different values in working window field 506 (e.g., 90 or 60 days).

TN removal rule field 508 may specify the rules for removing excess TNs from a block of TNs associated with a group. TN removal rule field 508 may, for example, specify the order, order of priority, and/or type of TNs that should be considered for removal, if and when TNs are to be removed. For example, record 552-1 specifies that for group 422-1, the oldest of the non-working TNs (but not younger than 18 months) should be removed first. Then, according to record 522-1, TNs with patterns should be considered for removal. Examples of specific patters are given below. Then, according to record 522-1, TNs in sequential order (e.g., the last four digits of 7235, 7236, 7237, 7238, etc.) may be considered for removal.

TNs with patterns, which may also be specified in TN removal rule field 508, may include (1) TNs with the same last four digits (e.g., 1111 or 7777); (2) TNs with any three of the last four digits being the same (e.g., 1151 or 3833); (3) TNs with the same last three digits (4333 or 2999); (4) TNs with double digits (e.g., 2263 or 6223); (5) TNs with two double digits (e.g., 4455 or 7733); (6) TNs with zero for the last two digits (e.g., 3200 or 4100); (7) TNs with zero for the last three digits (e.g., 5000 or 8000); (8) TNs with the same first three digits (e.g., 9993 or 2227); (9) TNs with mirrored digits (e.g., 6446 or 7557); (10) TNs with repetitive digits (e.g., 2323 or 8484); (11) TNs with sequential ascending digits (e.g., 3456 or 7890); and/or (12) TNs with sequential descending digits (e.g., 7654 or 9876). Other patterns are possible.

Parameters in settings table 304 may be programmed or set by the telephone company or the customer associated with the group, for example. Some customers and groups may desire a different cushion factor (specified in cushion factor field 504) than other customers or groups. As shown in setting table 304, for example, group 422-1 includes an 80% cushion factor, whereas group 422-2 includes a 60% cushion factor. Further, some groups and customers may desire a different working window (specified in field 506) than other groups or customers. As shown in settings table 304, for example, group 422-1 specifies a working window of 90 days, whereas group 422-2 specifies a working window of 60 days. Also, some groups and customers may desire a different excess TN removal rule (specified in field 508) than other customers or groups. As shown in settings table 304, for example, group 422-1 includes a rule to remove the oldest non-working TNs first, but none less than 18 months. This rule may work well with a university because a student may not be absent for more than 18 months without withdrawing from the university. On the other hand, the rule for group 422-2 indicates that non-working TNs including "99" should not be removed. This rule may work well for a company with "99" in its name.

Figure 6A:
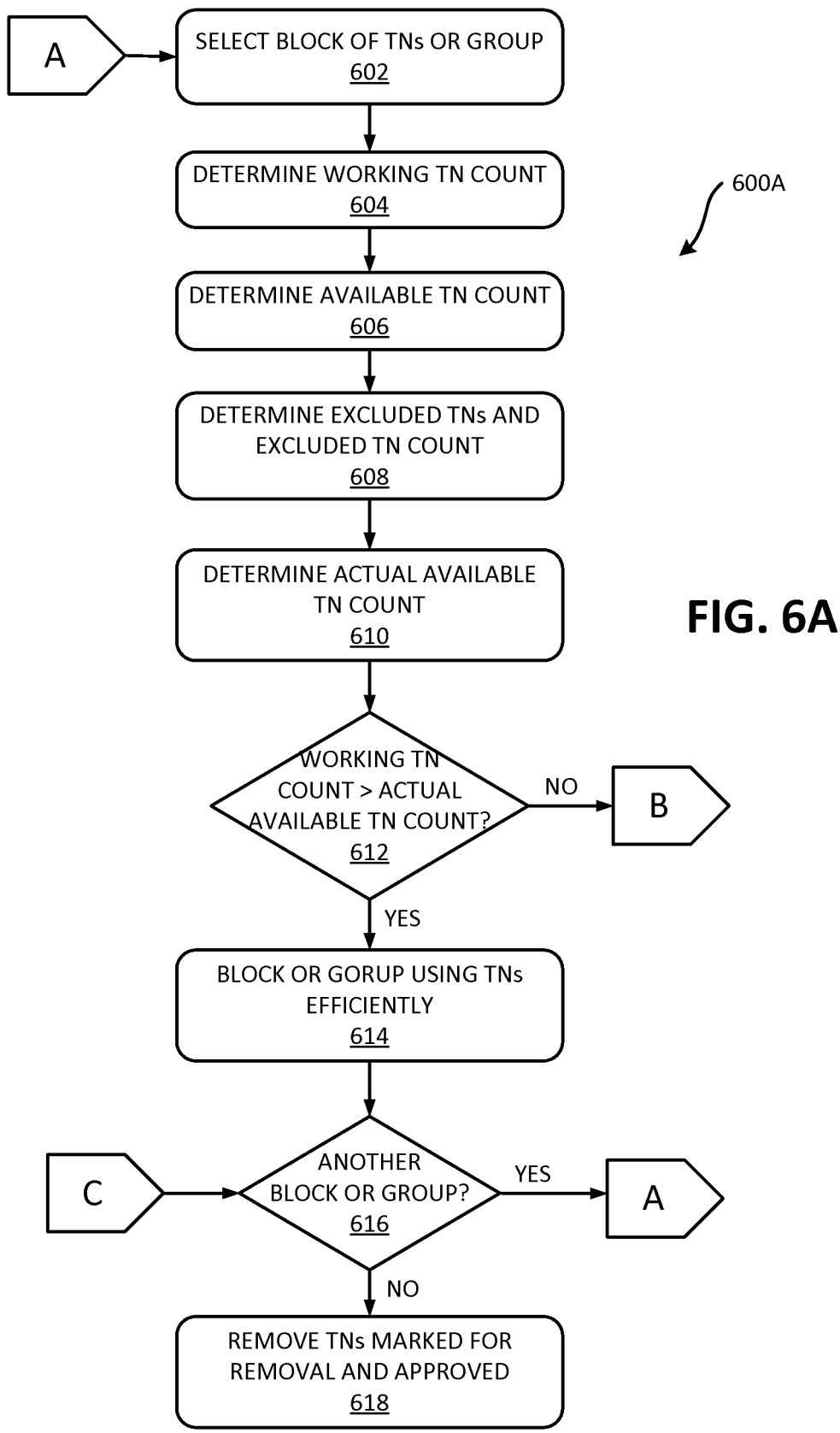
FIGS. 6A and 6B are flowcharts of processes for optimizing telephone number use for a block of telephone numbers.
Figure 6B:
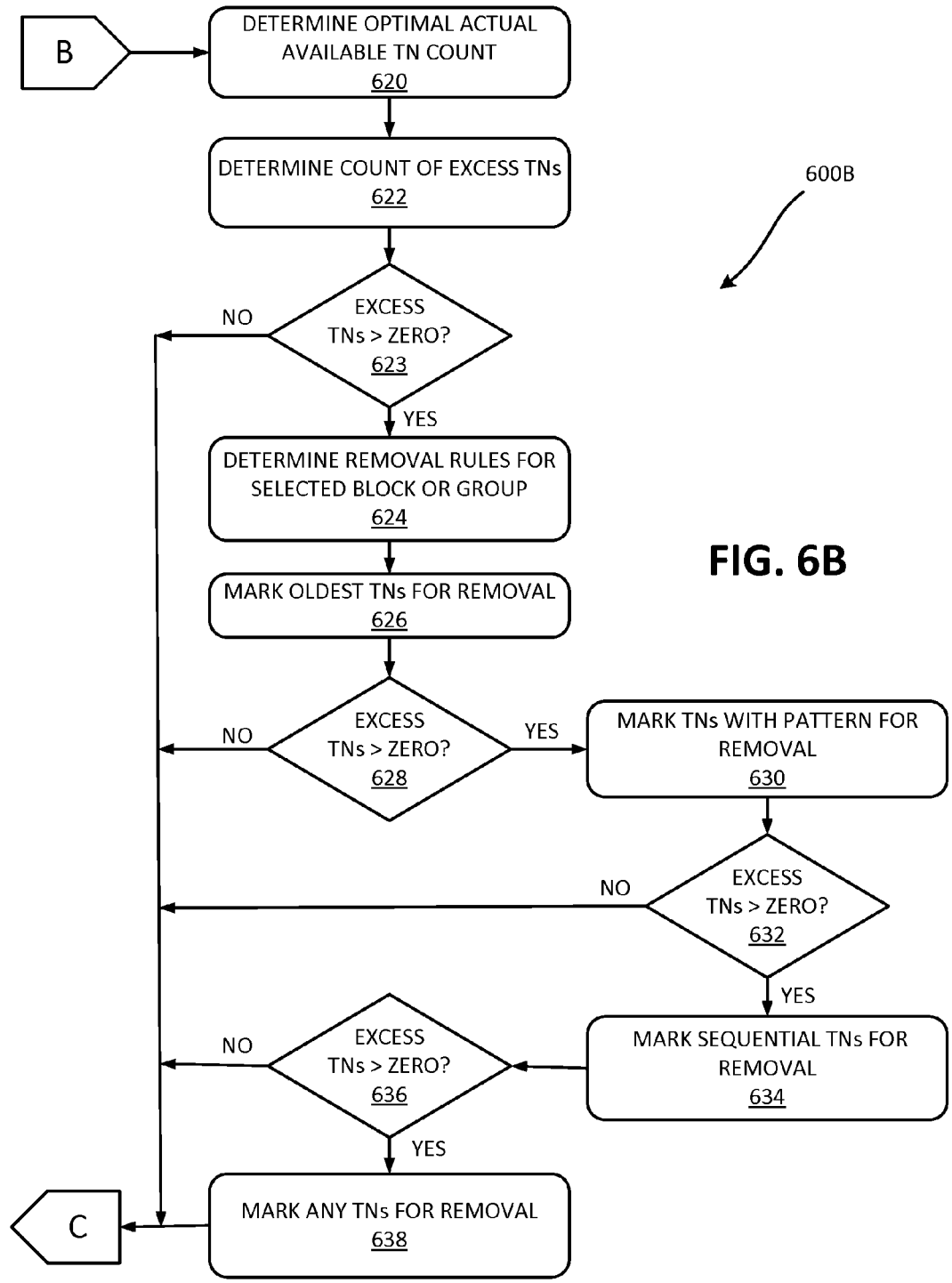

FIGS. 6A and 6B are flowcharts of processes 600A and 600B for optimizing TN use for blocks of TNs associated with groups, such as PBX or Centrex groups. As discussed above, optimization logic 306 may perform processes 600A and 600B. Process 600A may begin with the selection of a block of TNs or a group (e.g., a PBX or Centrex group) associated with a block of TNs (block 602). In this example, controller 112 may select the block of TNs assigned to group 422-1 (see FIGS. 4 and 5), which may be associated with customer premises 122-1 (see FIG. 1).

Controller 112 may determine the number (e.g., a count) of working TNs (block 604) for the corresponding group. In this example, controller 112 may query TN table 302 to determine the number of working TNs assigned to group 422-1. As discussed above with respect to TN table 302, each record 452-x may specify in working flag field 406 whether a TN assigned to a group is working. A TN is working if, for example, a call to the TN results in one of phones 110 ringing. In one implementation, the working TN count may be given the variable name WRK_TN_COUNT.

Figure 7:
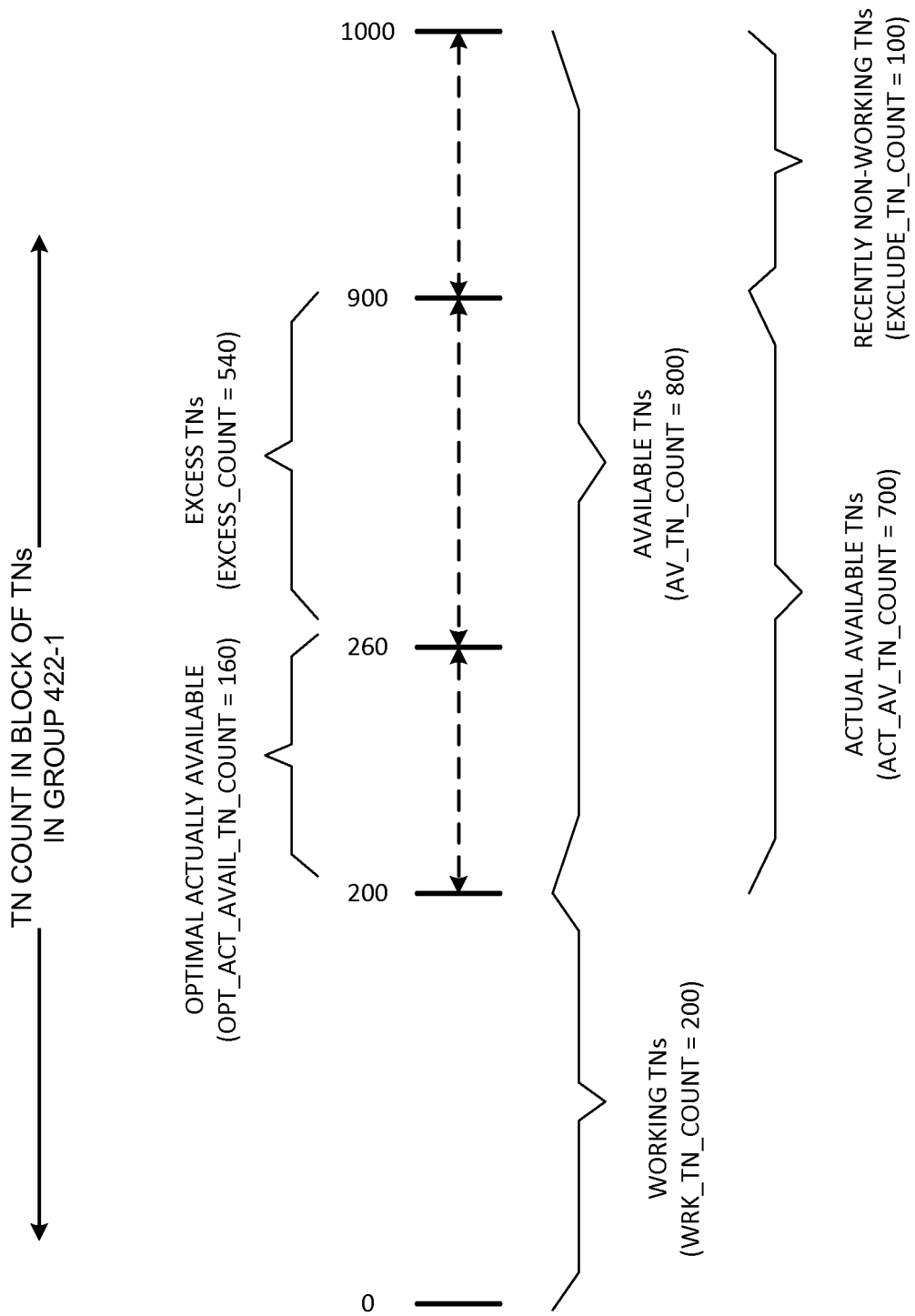
FIG. 7 is a chart illustrating counts for available, optimal available, and working telephone numbers.

FIG. 7 is a chart illustrating counts for a block of TNs in group 422-1. As shown, group 422-1 includes 200 TNs in use (e.g., "working TNs"), and this count number has been assigned to the variable WRK_TN_COUNT.

Controller 112 may also determine the number (e.g., a count) of available TNs (block 606) for the corresponding group (e.g., the number of non-working or unused TNs assigned to the group). In this example, controller 112 may query TN table 302 to determine the number of available (e.g., non-working) TNs assigned to group 422-1. In another embodiment, to determine the count of available TNs, controller 112 may query TN table 302 to determine the total number of TNs assigned to group 422-1 and may then subtract the number of working TNs from the total number of TNs assigned. In one implementation, the available TN count may be given the variable name AV_TN_COUNT.

Returning to FIG. 7, group 422-1 includes 800 available TNs assigned to group 422-1, and this count number has been assigned to the variable AV_TN_COUNT.

As mentioned above, a TN may transition from non-working (as specified in working flag field 406) to working during a period of time. For example, as discussed above, a TN may become non-working when an employee quits but may become working again when a new employee arrives. In one embodiment, such a TN may be excluded from consideration for removal. Controller 112 may determine the number (e.g., a count) of TNs to exclude (and which TNs to exclude) from consideration of removal (block 608). In this example, controller 112 may query settings table 304 (e.g., working window field 506) to determine the threshold time period after which a TN becomes non-working before the TN is considered for removal. Controller 112 may also query TN table 302 (e.g., periods working field 410) to determine which TNs transitioned to a non-working state within the time specified in working window field 506. These TNs may be excluded from being removed. In one implementation, the excluded TN count may be given the variable name EXCLUDE_TN_COUNT.

Returning to FIG. 7, group 422-1 includes 100 TNs that have recently become non-working (e.g., within the past 90 days), and this count number has been assigned to the variable EXCLUDE_TN_COUNT.

Controller 112 may determine the number (e.g., a count) of the actual available TNs (block 610). The actual available TNs may be calculated by subtracting the excluded count from the available TN count determined, for example, at block 606. In one implementation, the actual available TN count may be given the variable name ACT_AV_TN_COUNT. Thus, in one embodiment, the actual available TN count may be calculated by the following equation:

ACT_AV_TN_COUNT=AV_TN_COUNT−EXCLUDE_TN_COUNT.

Returning to FIG. 7, group 422-1 includes 700 (=800−100) TNs that are actually available, and this count is assigned to the variable ACT_AV_TN_COUNT.

If the working TN count is larger than the actual available TN count (block 612: YES), then the use of the TNs assigned to the selected block or group may be considered efficient (block 614). On the other hand, if the working TN count is not larger than the actual available TN count, then process 600B may be invoked, as described below. In one implementation, the condition of block 612 may be expressed as the following equation: WRK_TN_COUNT>ACT_AV_TN_COUNT. In another embodiment, if the working TN count is larger than the available TN count, then the use of the TNs assigned to the selected block or group may be considered efficient.

Returning to FIG. 7, the actual available TN count (700) for group 422-1 is greater than the working TN count (200). As such, in one embodiment, the use of the TNs assigned to group 422-1 may not be considered efficient. In other words, the use of TNs may require further analysis (e.g., process 600B) to determine if any TNs should be removed from the block of TNs assigned to group 422-1.

Process 600B may begin with the determination of the optimal actual available TN count (block 620). Controller 112 may determine the optimal actual available TN count by multiplying the working TN count by a factor, e.g., a cushion factor. In one embodiment, controller 112 may query settings table 304 to determine the cushion factor associated with group 422-1 (e.g., 80%) and multiply the working TN count by the factor to determine the optimal number of TNs actually available. The optimal actual available TN count, in this embodiment, takes into account a margin (e.g., the cushion factor) of spare TNs for a group. For example, as described above, a university may be associated with spare, non-working TNs so that when a student returns from studying abroad, that student may be assigned the same TN as when the student left. In one implementation, the optimal actual available TN count may be given the variable name OPT_ACT_AVAIL_TN_COUNT. In one embodiment, the optimal actual available TN count may be determined by the following equation: OPT_ACT_AVAIL_TN_COUNT= (X*WRK_TN_COUNT)/100. In one embodiment, X is a percentage that is less than 100%, but a percentage greater than 100% is possible. In one embodiment, the "optimal" count may also be considered a "target" count. Also, the optimal actual available TN count may be referred to as the "optimal TN count," including in cases where the excluded count is zero or recently non-working TNs are not considered during the optimization process.

Returning to FIG. 7, if the cushion factor is 80% and the number of working TNs is 200 for group 422-1, then the optimal actual available TN count may be calculated as 160 (e.g., 80% of 200). This number may be stored in variable OPT_ACT_AVAIL_TN_COUNT.

Controller 112 may determine a count of the excess TNs (block 622). In one embodiment, controller 112 may determine the excess TN count by subtracting the optimal actual available TN count from the actual available TN count. Thus, the excess TN count may be the number of TNs that the actual available TN count is above the optimal level. As discussed above, the actual available TN count may consider the possibility of TNs being reused (e.g., transitioning from working to non-working and back) within a period of time. The optimal available TN may consider the possibility of spare, non-working TNs. Thus, the excess TN count may consider both (e.g., the reuse of TNs within a period of time and spare, non-working TNs), and may also be called the "excess actual available TN count." The excess TN count may be the number of TNs targeted for removal. In one implementation, the count of excess TNs may be given the variable name EXCESS_COUNT. In one embodiment, the excess actual available TN count may be determined using the following equation: EXCESS_COUNT=ACT_AV_TN_COUNT−OPT_ACT_AVAIL_TN_COUNT.

Returning to FIG. 7, group 422-1 includes 700 TNs that are actually available and the optimal number is 160. Thus, the excess TN count may be calculated as 540 (i.e., 700 minus 160), and this value may be stored in EXCESS_COUNT.

If the excess count of TNs is greater than zero (block 623: NO), then controller 112 may determine the removal rules for the selected block of TNs or group (block 624). For example, controller 112 may query settings table 304 to determine that excess TNs for group 422-1 should be considered for removal in the following order of priority: (1) the oldest non-working TNs (but not younger than 18 months); (2) TNs with a patterns; and (3) TNs in sequential order. Process 600B shown in FIG. 6B continues according to the exemplary removal rules determined at block 624. Other flows in process 600B are possible depending on the removal rules determined at block 624.

In the current example, the oldest TNs may be marked for removal (block 626). Controller 112 may traverse TN table 302 and mark the oldest non-working TNs for removal (but none younger than 18 months). For example, controller 112 may enter a "Y" in marked-for-removal field 412 of TN table 302 for TNs that match the criteria. For every TN marked for removal, controller 112 may decrement the count of excess TNs (EXCESS COUNT). In one embodiment, controller 112 does not mark for removal the TNs that became non-working within the working window threshold determined at block 604 above. In one embodiment, controller 112 does not mark for removal more than the excess count of TNs determined at block 622.

If the count of excess TNs remains greater than zero (e.g., after TNs being marked for removal at block 626) (block 628: YES), then TNs having a pattern may be marked for removal (block 630). As discussed in more detail above, TNs with patterns may include, for example, TNs with: the same last three or four digits; any three of the last four digits being the same; one or two sets of double digits; zero for the last two or three digits; the same first three digits; mirrored digits; repetitive digits; or sequential ascending or descending digits.

Controller 112 may enter a "Y" in marked-for-removal field 412 of TN table 302 for TNs that match the criteria. For every TN marked for removal, controller 112 may decrement the count of excess TNs (EXCESS_COUNT). In one embodiment, controller 112 does not mark for removal the TNs that became non-working within the working window threshold determined at block 604 above. In one embodiment, controller 112 does not mark for removal more than the excess count of TNs determined at block 622.

If the count of excess TNs remains greater than zero (e.g., after TNs being marked for removal at blocks 626 and 630) (block 632: YES), then TNs in sequential order may be marked for removal (block 634). Controller 112 may enter a "Y" in marked-for-removal field 412 of TN table 302 for TNs that match the criteria. For every TN marked for removal, controller 112 may decrement the count of excess TNs (EXCESS_COUNT). In one embodiment, controller 112 does not mark for removal the TNs that became non-working within the working window threshold determined at block 604 above. In one embodiment, controller 112 does not mark for removal more than the excess count of TNs determined at block 622.

If the count of excess TNs remains greater than zero (e.g., after marking TNs for removal at blocks 626, 630, or 634) (block 636: YES), then more excess TNs may be marked for removal (block 638). For example, any (e.g., random) non-working TNs may be marked for removal. Controller 112 may enter a "Y" in marked-for-removal field 412 of TN table 302 for TNs that match the criteria. For every TN marked for removal, controller 112 may decrement the count of excess TNs (EXCESS_COUNT). As described above, in one embodiment, controller 112 does not mark for removal the TNs that became non-working within the working window threshold determined at block 604 above. In addition, in one embodiment, controller 112 does not mark for removal more than the excess count of TNs determined at block 622.

Once one block of TNs or group has been analyzed (block 623: NO; block 628: NO; block 632: NO; or block 636: NO), processes 600A and 600B may analyze the use of TNs in another block of TNs or another group. Thus, if another block of TNs associated with a PBX or Centrex group exists (block 616: YES), then process 600A returns to block 602 where another block of TNs associated with a PBX or Centrex group may be selected.

If no block of TNs associated with a PBX or Centrex group remain for analysis (block 616: NO), then TNs marked for removal (and having been approved for removal) may be removed (e.g., disassociated) from the corresponding group (block 618). TNs may be approved for removal, for example, after a customer and/or the telephone company has approved the TNs marked for removal.

While the embodiment of processes 600A and 600B use equations and variables, other embodiments may use different equations and variables. For example, in another embodiment, the excluded count (EXCLUDED_COUNT) may be added to the working TN count (WRK_TN_COUNT) to determine an actual working TN count (ACT_WRK_TN_COUNT) rather than or in addition to determining an actual available TN count (ACT_AV_TN_COUNT). In this embodiment, an optimal TN count (OPT_TN_COUNT) may be determined based on the working TN count (WRK_TN_COUNT) and/or the actual working TN count (ACT_WRK_TN_COUNT), for example. Thus, in this embodiment, the excluded TN count may be considered as part of the spare cushion of non-working numbers. Further, the excess TN count may be determined by, for example, subtracting the optimal TN count (OPT_TN_COUNT) from the available TN count (AV_TN_COUNT).

In another embodiment, recently non-working TNs may not be considered during the optimization process (e.g., the working window threshold may be zero days). In another embodiment, the block of TNs may be associated with a group or customer other than a PBX or Centrex group.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
    determining, by a processor, a count of excess telephone numbers (TNs) for removal from a block of TNs associated with a customer;
    determining, by the processor, periods of time that each of more than one of the TNs in the block of TNs has not been working;
    determining, by the processor, a threshold period of time, wherein the count of excess TNs does not include the more than one of the TNs in the block of TNs that have not been working for less than the threshold period of time;
    determining, by the processor, an order of priority for removing the excess TNs from the block of TNs; and
    marking, by the processor in a database, the excess TNs for removal from the block of TNs in the determined order of priority.

2. The computer-implemented method of claim 1, wherein the order of priority includes a first priority corresponding to one of:
    marking a set of oldest non-working TNs for removal, marking non-working TNs having digits that match a pattern for removal, or marking sequential non-working TNs for removal.

3. The computer-implemented method of claim 2, wherein the order of priority includes a second priority, lower than the first priority, corresponding to one of:
    marking non-working TNs having digits that match a pattern for removal, or marking sequential non-working TNs for removal.

4. The computer-implemented method of claim 2, further comprising removing the TNs marked for removal from the block of TNs associated with the customer.

5. The computer-implemented method of claim 2, wherein the TNs having digits that match a pattern include TNs having a same last three digits, or TNs having zero as a last digit and zero as a second to last digit.

6. The computer-implemented method of claim 1, further comprising:
    querying a settings database to determine the period of time.

7. The computer-implemented method of claim 1, further comprising:
    determining a count of working TNs in the block of TNs associated with the customer, wherein the count of excess TNs is based on the count of working TNs and a spare number of TNs.

8. The computer-implemented method of claim 7, further comprising:
    determining the spare number of TNs based on the number of working TNs, wherein the block of TNs is associated with a private branch exchange (PBX) or a central exchange (Centrex) group.

9. A system comprising:
    a network device including:
        a memory to store a database of telephone numbers (TNs) in a block of TNs associated with a customer, wherein the memory is configured to store an order of priority for removing excess TNs from the block of TNs; and
        a processor to determine the excess TNs for removal from the block of TNs associated with the customer, wherein the processor is configured to query the memory to determine the order of priority and to mark, in the determined order of priority, the excess TNs for removal from the block of TNs,
    wherein the processor is further configured to determine a period of time that one or more of the TNs in the block of TNs has not been working, and exclude the one or more TNs from a count of the excess TNs when the period of time is less than a threshold.

10. The system of claim 9, wherein the determined order of priority includes a first priority corresponding to one of:
    marking a set of oldest non-working TNs for removal, marking non-working TNs having digits that match a pattern for removal, or marking sequential non-working TNs for removal.

11. The system of claim 10, wherein the determined order further includes a second priority corresponding to one of:
    marking non-working TNs having digits that match a pattern for removal, or marking sequential non-working TNs for removal, wherein the second priority is lower than the first priority.

12. The system of claim 10, wherein the processor is further configured to remove the TNs marked for removal from the block of TNs associated with the customer.

13. The system of claim 9,
wherein the memory is configured to store a database of thresholds associated with a plurality of customers; and
wherein the processor is further configured to query the memory to determine the threshold associated with the customer.

14. The system of claim 9, wherein the processor is further configured to determine a count of working TNs in the block of TNs associated with the customer, wherein a count of excess TNs is based on the count of working TNs and a spare number of TNs.

15. The system of claim 14, further comprising:
a switch associated with a private branch exchange (PBX) or a central exchange (Centrex) group, wherein the PBX or Centrex group is associated with the block of TNs associated with the customer, wherein the processor is further configured to determine the spare number of TNs based on the number of working TNs.

16. The system of claim 9, wherein the TNs having digits that match a pattern include TNs having a same last three digits, or TNs having zero as a last digit and zero as a second to last digit.

17. A computer-implemented method comprising:
determining, by a processor, a count of working telephone numbers (TNs) in a block of TNs associated with a customer;
determining, by the processor, a spare number of TNs based on the count of working TNs;
determining, by the processor, a count of excess telephone numbers (TNs) for removal from a block of TNs associated with a customer, wherein the count of excess TNs is based on the spare number;
determining, by the processor, a period of time that one or more of TNs in the block of TNs has not been working and excluding the one or more TN from the count of excess TNs when the period of time is less than a threshold;
determining, by the processor, an order of priority for removing the excess TNs from the block of TNs; and
marking, by the processor, the excess TNs for removal from the block of TNs in the determined order of priority.

18. The computer-implemented method of claim 17, wherein the determined order of priority includes a first priority corresponding to one of:
marking a set of oldest non-working TNs for removal, marking non-working TNs having digits that match a pattern for removal, or marking sequential non-working TNs for removal.

19. The computer-implemented method of claim 18, wherein the determined order of priority includes a second priority, lower than the first priority, corresponding to one of:
marking non-working TNs having digits that match a pattern for removal, or marking sequential non-working TNs for removal.

20. The computer-implemented method of claim 19, further comprising removing the TNs marked for removal from the block of TNs associated with the customer, wherein the block of TNs is associated with a private branch exchange (PBX) or a central exchange (Centrex) group.

* * * * *